US007584660B2

United States Patent
Lysen

(10) Patent No.: US 7,584,660 B2
(45) Date of Patent: Sep. 8, 2009

(54) SHOCK ISOLATION SYSTEM FOR AN INERTIAL SENSOR ARRANGEMENT

(75) Inventor: Heinrich Lysen, Garching (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 8 days.

(21) Appl. No.: 11/574,548

(22) PCT Filed: Jun. 23, 2006

(86) PCT No.: PCT/DE2006/001083

§ 371 (c)(1),
(2), (4) Date: Mar. 1, 2007

(87) PCT Pub. No.: WO2007/003161

PCT Pub. Date: Jan. 11, 2007

(65) Prior Publication Data

US 2007/0266786 A1    Nov. 22, 2007

(30) Foreign Application Priority Data

Jul. 6, 2005    (DE)    .................. 20 2005 010 713 U

(51) Int. Cl.
*G01P 1/02*    (2006.01)
*G01C 19/00*    (2006.01)
(52) U.S. Cl. .............................. 73/493; 73/430; 73/510
(58) Field of Classification Search .................. 73/493, 73/496, 431, 430, 500, 510, 511
See application file for complete search history.

(56) References Cited

U.S. PATENT DOCUMENTS

| 3,565,386 | A | * | 2/1971 | Lemkuil et al. | ............. 248/573 |
| 3,843,108 | A | * | 10/1974 | Krupick et al. | ............. 267/137 |
| 4,433,491 | A | | 2/1984 | Ott et al. | |
| 4,987,684 | A | * | 1/1991 | Andreas et al. | ............... 33/304 |
| 5,237,871 | A | | 8/1993 | Henderson et al. | |
| 5,890,569 | A | * | 4/1999 | Goepfert | ..................... 188/378 |
| 6,457,373 | B1 | | 10/2002 | Lysen et al. | |
| 6,578,682 | B2 | | 6/2003 | Braman et al. | |
| 7,093,370 | B2 | * | 8/2006 | Hansberry et al. | ............ 33/313 |
| 7,345,953 | B2 | * | 3/2008 | Crickmore et al. | .......... 367/163 |
| 2004/0150144 | A1 | | 8/2004 | Goepfert et al. | |

FOREIGN PATENT DOCUMENTS

| GB | 802579 | | 10/1958 |
| GB | 2084330 | A | 4/1982 |
| GB | 2271422 | A | 4/1994 |
| WO | 9855832 | A1 | 12/1998 |
| WO | 2004/042425 | A1 | 5/2004 |

* cited by examiner

*Primary Examiner*—Helen C. Kwok
(74) *Attorney, Agent, or Firm*—David S. Safran; Roberts Mlotkowski Safran & Cole, P.C.

(57) ABSTRACT

The shock isolation system for an inertial sensor arrangement, on the one hand, causes an advantageous moment of inertia by the special arrangement of the individual sensors, especially of the gyroscope used. On the other hand, an advantageous long interval of the required shock-absorbing components ("shock mounts") is provided by the use of several tubular shells. A measurement device with this inertial sensor arrangement thus achieves improved accuracy and reliability.

9 Claims, 8 Drawing Sheets

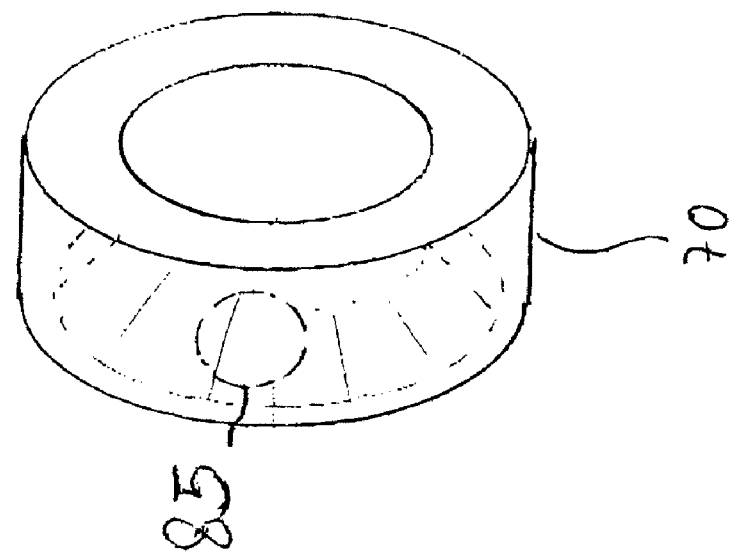
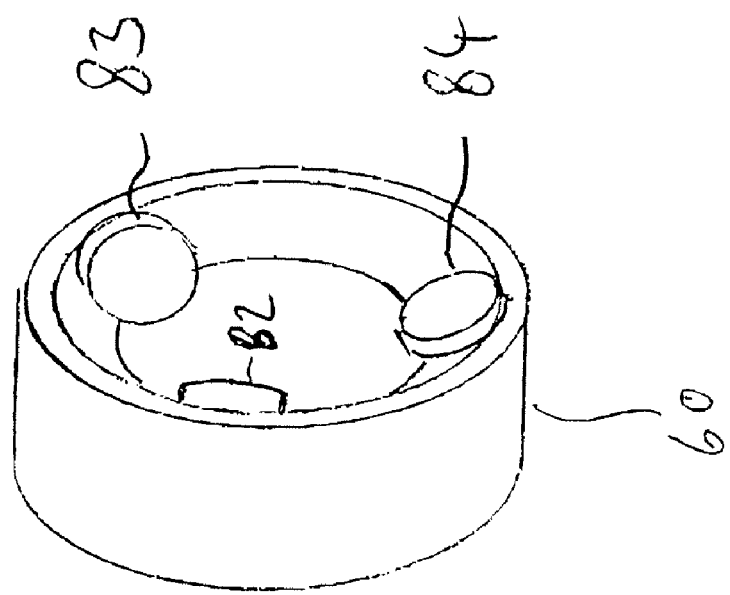
Fig. 3

SHOCK ISOLATION SYSTEM FOR AN INERTIAL SENSOR ARRANGEMENT

BACKGROUND OF THE INVENTION

1. Field of the Invention

This invention relates to a shock isolation system for an inertial sensor arrangement.

2. Description of Related Art

A system for isolation or damping of vibrations acting on an inertial sensor arrangement is known from U.S. Pat. No. 5,890,569 (inventor—Goepfert).

Making available a shock isolation system for inertial sensor arrangements, especially those with optically operating gyroscope systems, or highly sensitive accelerometers, always poses an especially serious problem for the engineer. On the one hand, long enough spring paths must be prepared to reliably capture impacts or mechanical shock effects, on the other hand, the relative position of the inertial sensor arrangement to be protected or isolated in relation to the measurement surfaces or edges to be defined may not be significantly changed by the effect of temperature or its position changes within the framework of measurement accuracy. In this connection, it has been proposed that these devices be equipped with very compliant impact protection devices which are deactivated for a short time at the instant of measurements, and during the remaining time impart shock and impact protection (U.S. Pat. No. 6,457,373).

SUMMARY OF THE INVENTION

The object of the invention is to devise improved shock, impact and vibration isolation for an inertial sensor arrangement which is continually active, which distinctly improves the measurement accuracy of the inertial sensor arrangement, which is insensitive to position and temperature, and which is characterized by especially low weight, particularly for construction volumes as small as possible.

The invention is based on use of a multiple casing to increase the positional stability of the inertial sensor arrangement relative to a surrounding housing, hollow cylindrical components which are arranged essentially concentrically to one another being provided as shells in an innovative manner.

The invention is furthermore based on a long spacing of the required shock damping components ("shock mounts") being formed by using several tubular shells, which spacing significantly increases the precision of the inertial sensor arrangement but, nevertheless, offers the required protection against higher external accelerations.

In particular, the invention calls for a number of shock mounts to be provided, with centers which span the volume of a prism with an area which has a diameter of a maximum 50% of the length of the prism.

The invention is also based on the fact that, in one special arrangement of the individual gyro systems within the inertial sensor arrangement, an especially advantageous mass distribution or an especially advantageous moment of inertia is achieved. The moment of inertia created in this way greatly improves the effectiveness of the so-called dithering within the gyroscope. This applies especially to gyro systems which are designed primarily for determining the angle coordinates "azimuth" (="yaw") and "elevation" (="pitch").

The invention is explained in detail below with reference to the accompanying drawings.

BRIEF DESCRIPTION OF THE DRAWINGS

FIG. 3 shows the shock reducing supports with shock mounts;

DETAILED DESCRIPTION OF THE INVENTION

Figure 1:
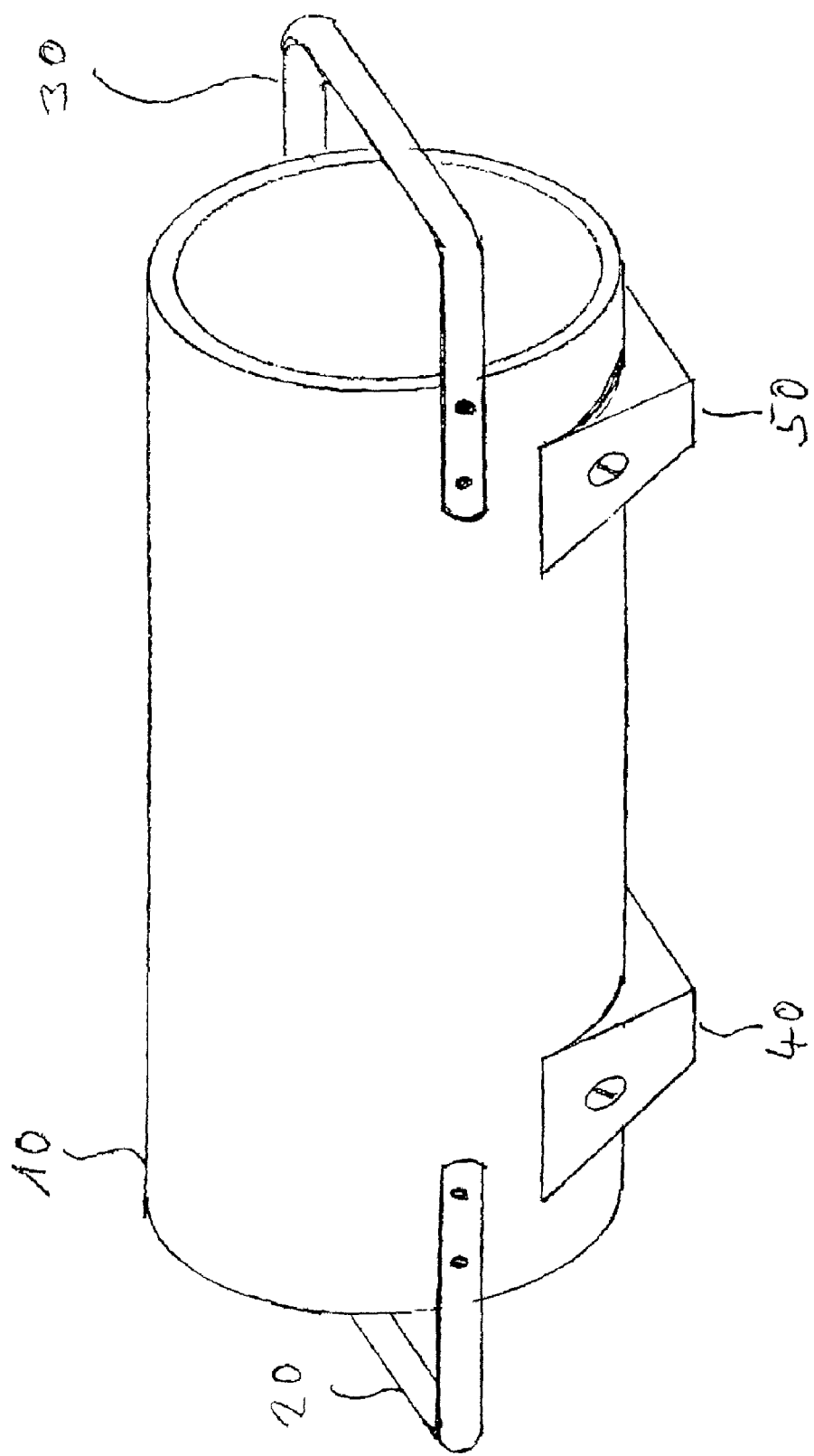
FIG. 1 shows the general structure of an inertial probe in accordance with the invention.

FIG. 1 shows, in a outside view, the general shape of the inertial probe in accordance with the invention. It has an essentially cylindrical shape; this is due to a cylindrical outside jacket 10. Carrying handles 20, 30 are attached to it. With these carrying handles, the inertial probe can be seated by means of skids 40, 50 on the articles to be measured, or can be pivoted on cylindrical objects according to the teaching of German Patent Application DE 101 94459.4 and corresponding U.S. Pat. No. 6,591,218, which is incorporated by reference to the extent necessary to complete an understanding of this aspect of the invention. Using the cylindrical outside jacket 10 yields an economical arrangement which is characterized by especially high mechanical stability.

Figure 2:
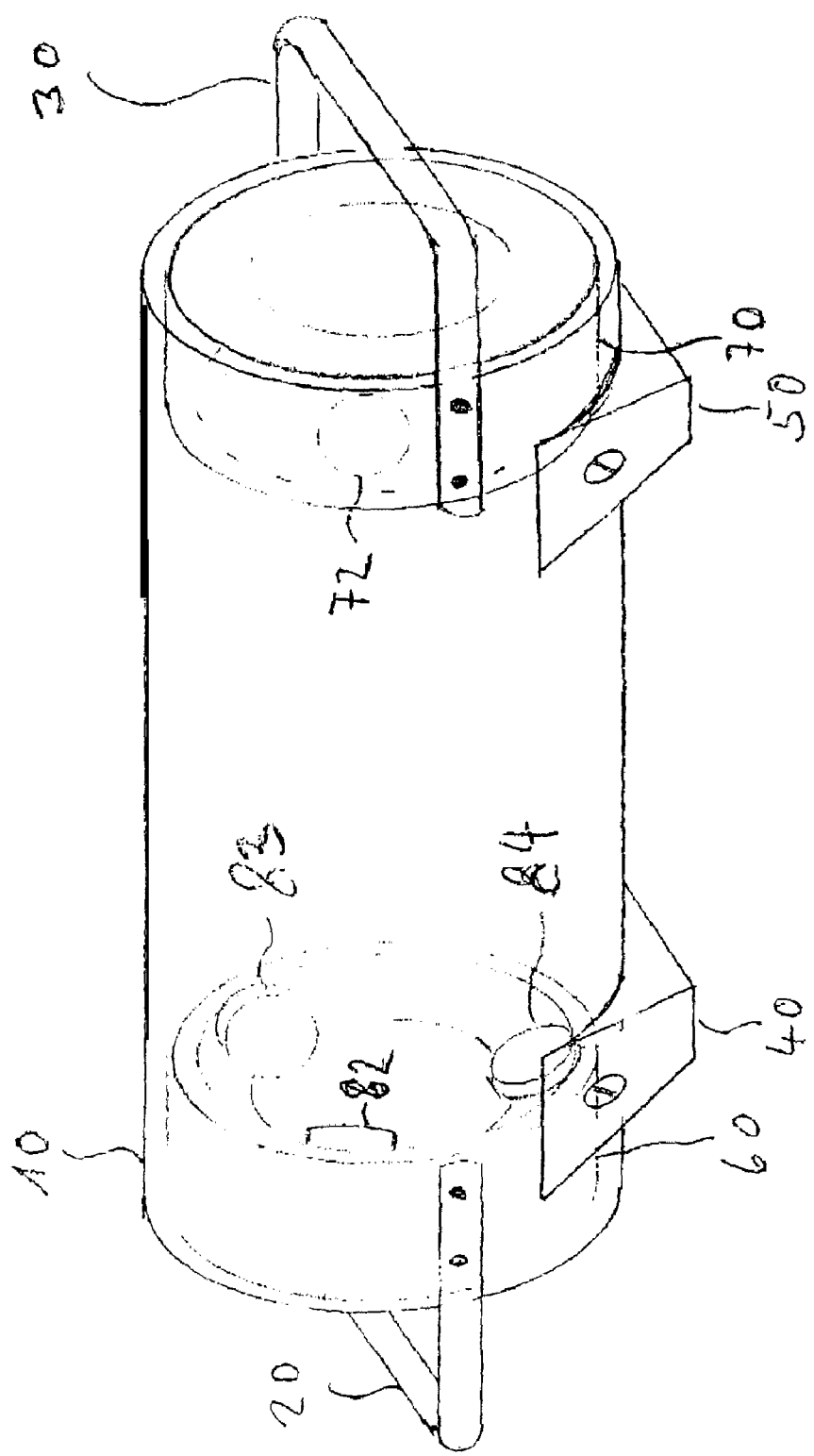
FIG. 2 shows the arrangement of shock reducing supports within the inertial probe.

As FIG. 2 shows, a set of shock reducing supports 60, 70 is provided in a concentric arrangement within the cylindrical outside jacket 10. A number of shock mounts 82, 83, 84, 85 etc. are attached to them precisely and without mechanical play. The important function of the shock mounts is to damp impacts possibly acting on the skids or the cylindrical outside jacket 10 of the probe so that the gyro systems of the probe are protected against high acceleration values.

In particular, the invention calls for a number of shock mounts to be provided, with centers which span the volume of a prism with an area which has a diameter of a maximum 50% of the length of the prism. The corresponding configuration of the shock reducing supports 60, 70 with a total of six high-precision shock mounts is shown separately in FIG. 3.

Figure 4:
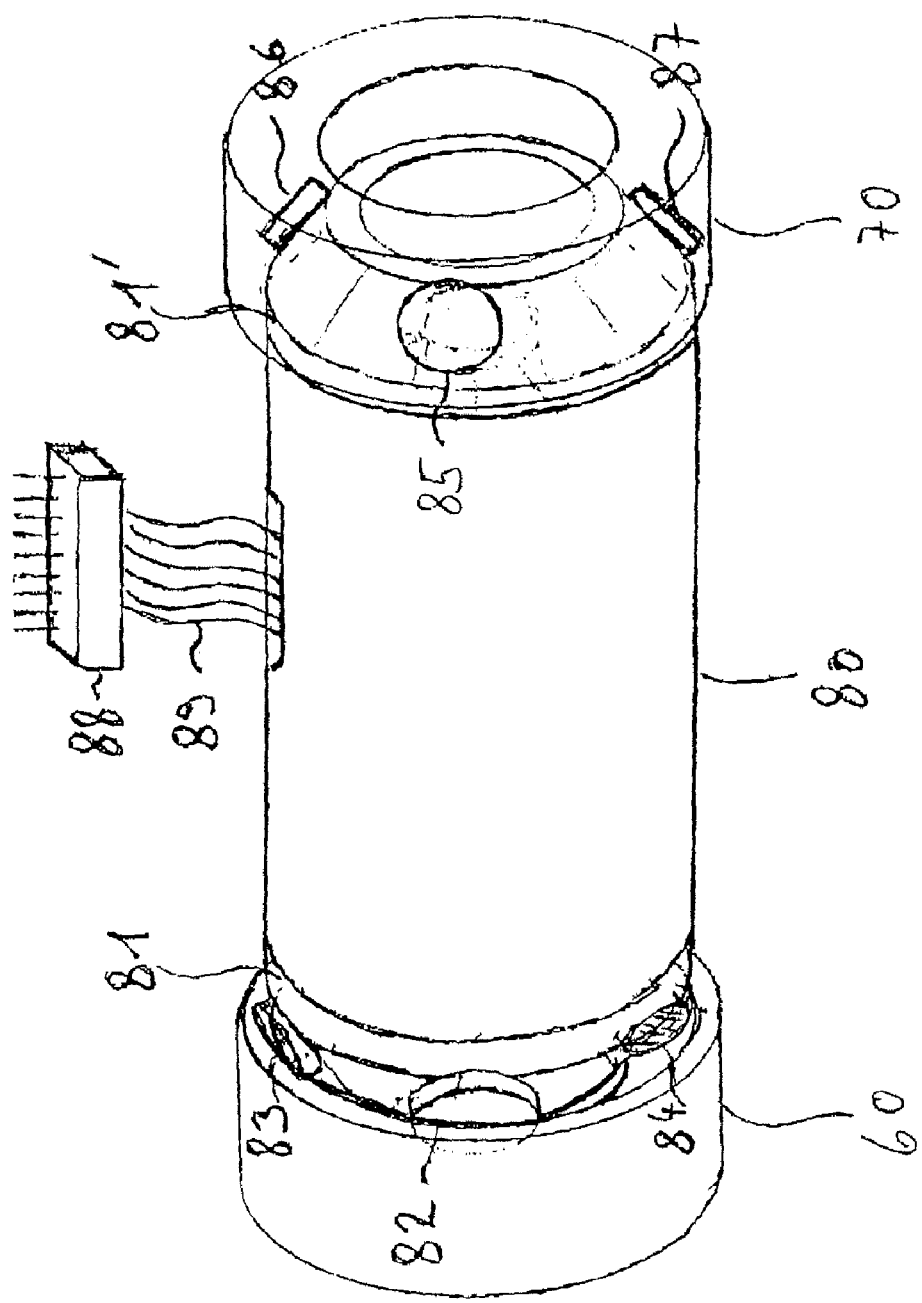
FIG. 4 shows the combination of shock reducing supports, shock mounts and an internal sensor platform.

FIG. 4 shows how an internal sensor platform 80 is mounted coaxially to the outside cylindrical jacket by means of shock reducing supports and the shock mounts 82-87. The internal sensor platform is preferably likewise of a stable, tubular (hollow cylindrical) shape and can have an opening so that electrical connections 89 to external electronics (not shown) can be set up by means of a plug device 88 or the like.

Figure 5:
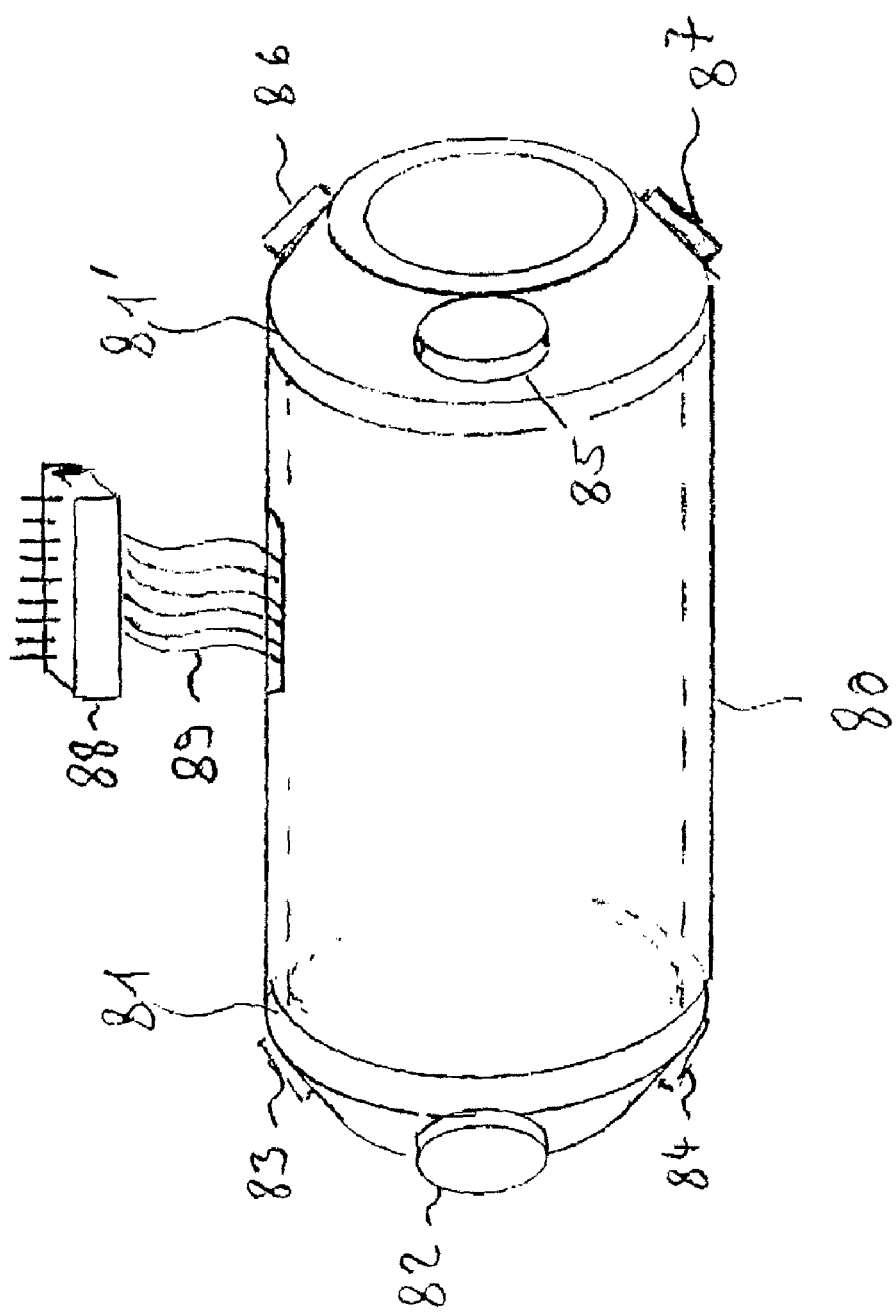
FIG. 5 shows the internal sensor platform with shock mounts and an electrical connection.

The internal sensor platform 80, together with the holding shock mounts, is shown separately in FIG. 5. It is advantageous to produce the inner sensor platform from several pieces, for example, to provide end caps, 81, 81' of roughly conical shape.

Figure 6:
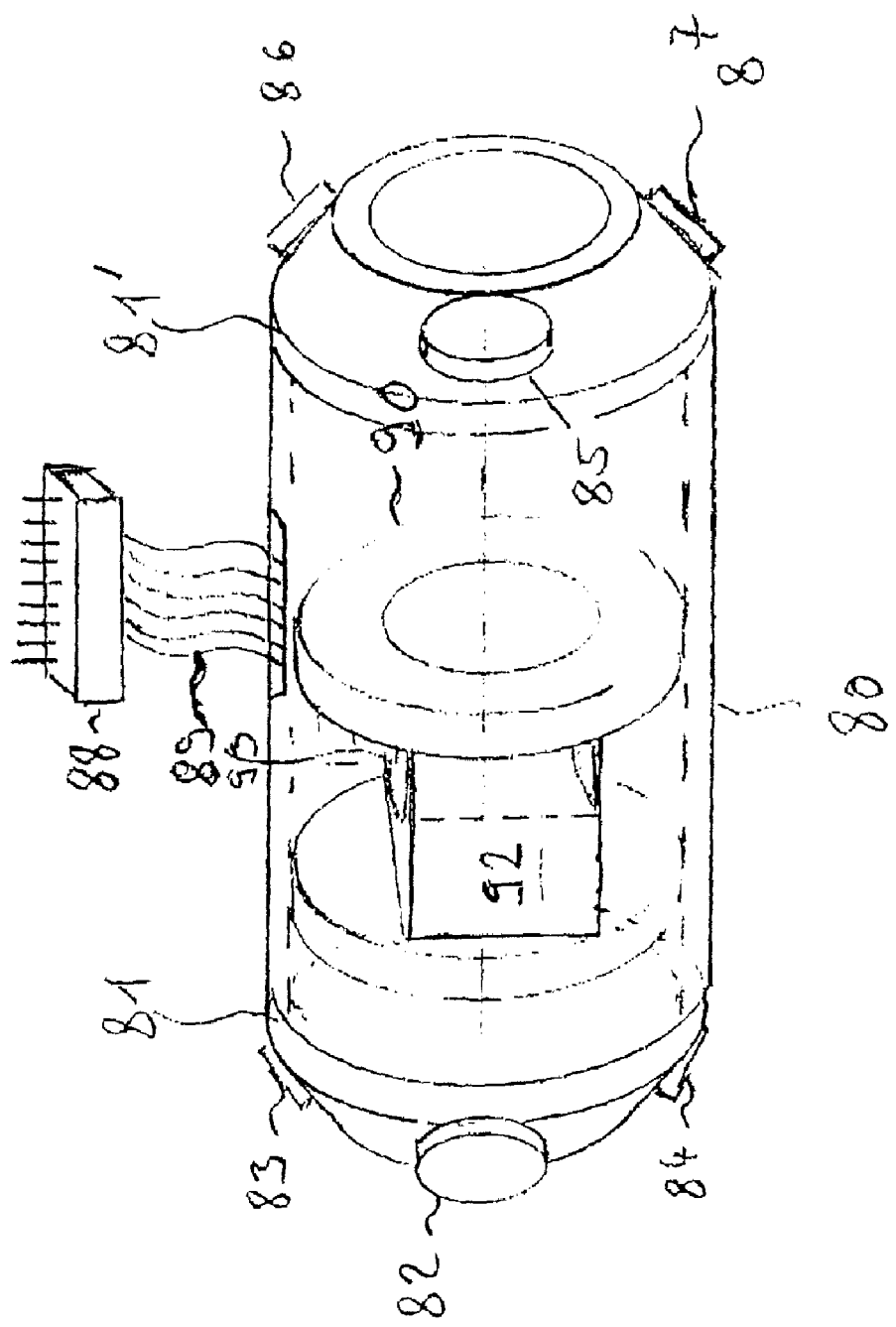
FIG. 6 shows the combination of internal sensor platform, internal sensor mounting and a sensor.
Figure 7:
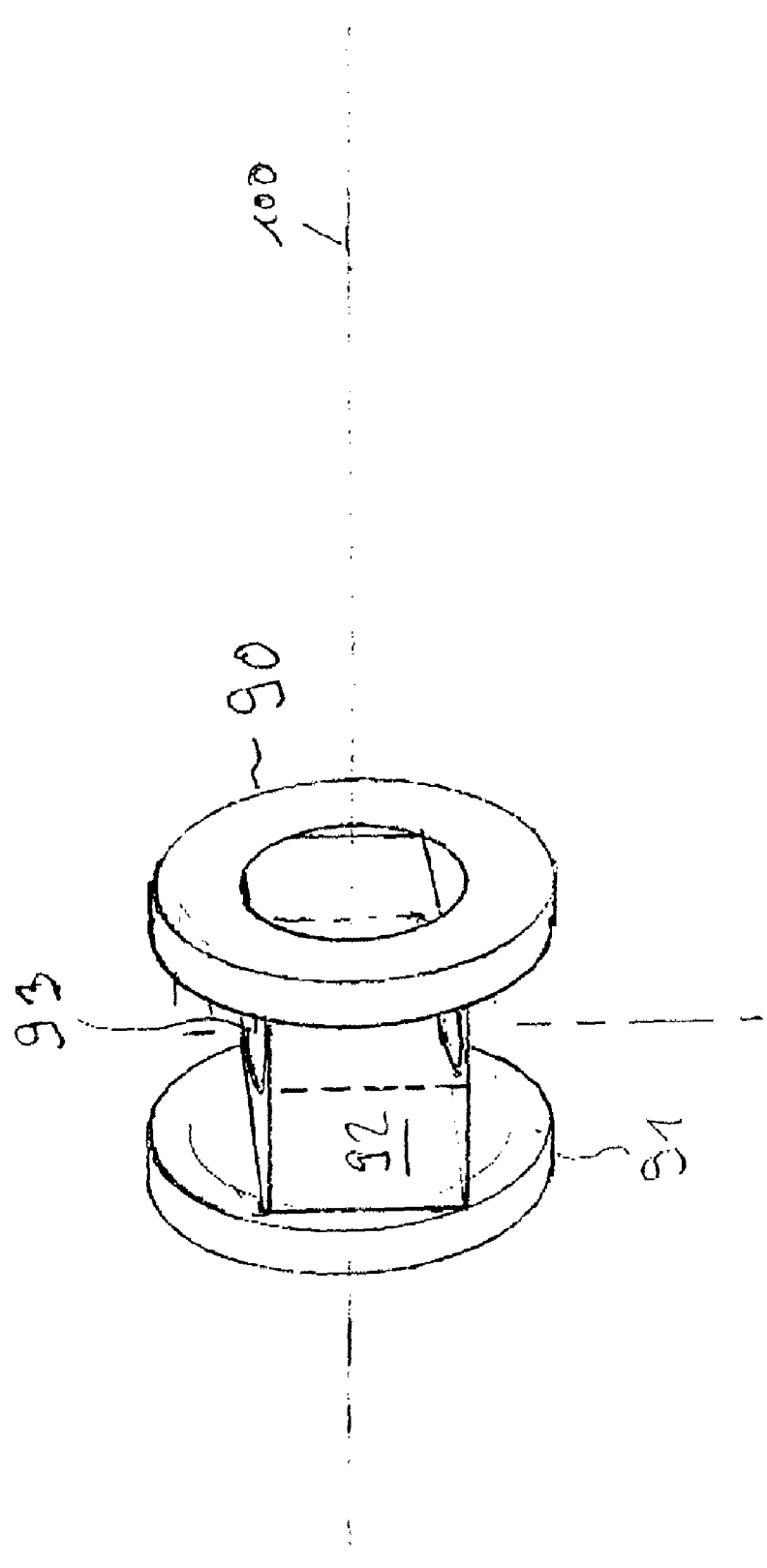
FIG. 7 shows an internal sensor mounting.

FIGS. 6 & 7 show the arrangement of an internal sensor mounting 90, 92 within the internal sensor platform 80. The mounting elements 90, 93 are especially suited to stably accommodate a gyroscope which senses azimuth and elevation. For this purpose, there can advantageously be a hollow cylindrical recess 93. There can not only be a single mounting element, but also two or more combinations of mounting elements 90, 93 within the internal sensor platform 80.

Figure 8:
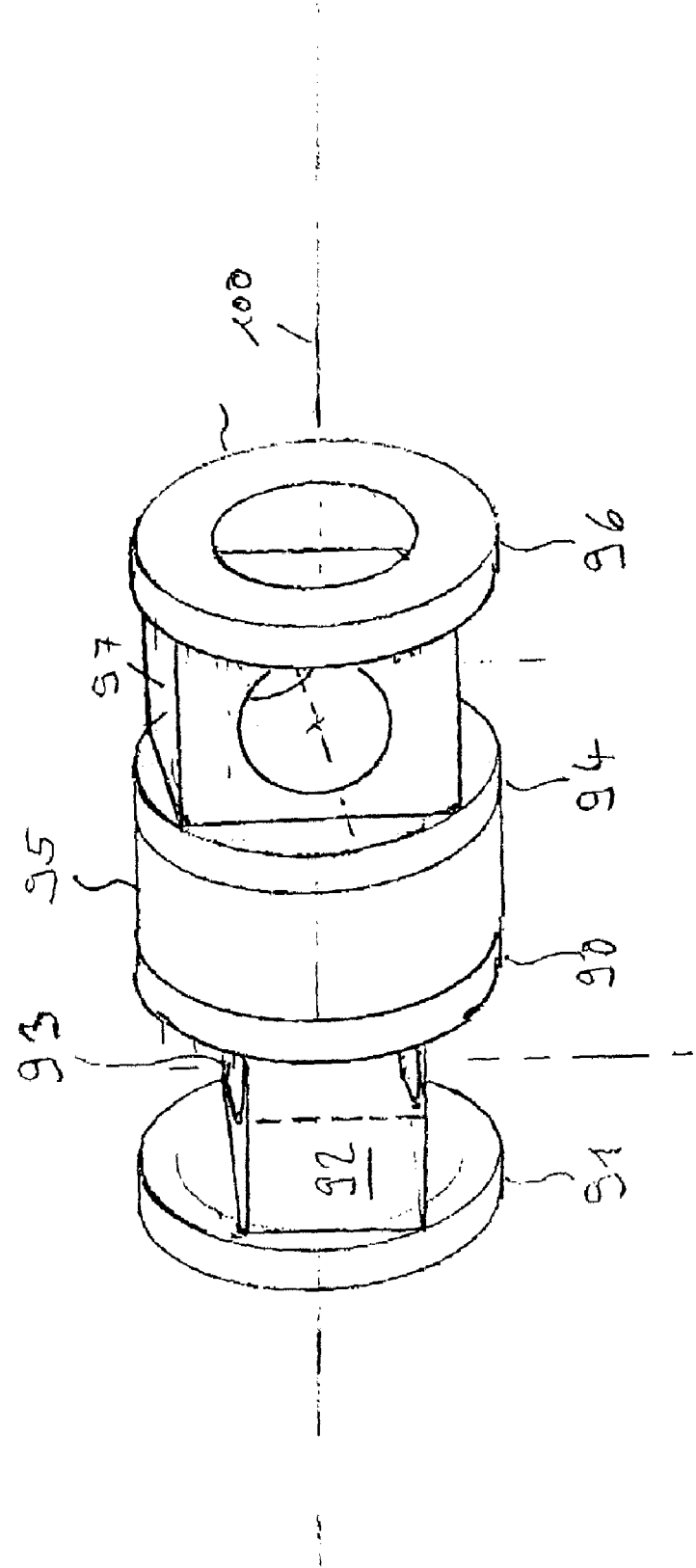
FIG. 8 shows a preferred arrangement of three sensor mountings for three sensors.

For an arrangement of three gyroscopes which interact in a gyro triad, an innovative arrangement of mounting elements and inertial sensors attached there, as shown in FIG. 8, is especially advantageous. The mounting elements 90, 94 arranged in the middle are suited in interplay with a mounting element 95 for holding a gyroscope (not shown) which detects mainly rolling revolutions around the lengthwise axis 100. A mounting element 92 is flanged to it on the left and a mounting element 91 is in turn attached to it. This combination is suited to holding a gyro which detects mainly yaw movements. The mounting element 97, together with the respective mounting element 96, is flanged on the right to the mounting element 94. The mounting element 97 is suited to holding a gyroscope which detects mainly pitch movements.

The important advantage of the arrangement shown in FIG. 8 is especially that ring laser gyroscopes held in mounting elements 92, 97, work with significantly better precision than if the conventional arrangements are used which are aligned essentially cubically. This is based on the fact that the reaction moments which are delivered by the so-called dither motors of the gyros and which are ultimately buffered by the shock mounts, now meet with distinctly increased moments of inertia, i.e., the inertial sensors are arranged such that effective moments of inertia of their masses, as compared to the compliance of the shock mounts by which the inertial sensors are attached, assume values that are as large as possible. The intended small vibration motion of the gyro housing around this theoretical axis, in this way, becomes smaller than in the normal case, but, due to the ratio of the moments of inertia to elasticities, in an altogether more reproducible and thus more accurate manner.

What is claimed is:

1. Shock-isolating holding device for an inertial sensor arrangement, comprising:
   a hollow cylindrical outer shell,
   shock reducing shock mounts which are arranged in a coaxial array in the outer shell, and
   a sensor platform of essentially hollow cylindrical shape which is attached coaxially within the outer shell by means of the shock mounts; and
   three inertial sensors;
   wherein at least two of the three inertial sensors have axes which are arranged on the sensor platform at an angle that is offset from a longitudinal axis of the hollow cylindrical outer shell, the angle at which the axes of each of the inertial sensors is arranged being different from that at which the axes of the other two inertial sensors are arranged and
   wherein each of the shock reducing shock mounts is obliquely angled relative to the longitudinal axis of the hollow cylindrical outer shell.

2. Shock-isolating holding device for an inertial sensor arrangement as claimed in claim 1, wherein the shock reducing shock mounts have centers which define corner points of an elongated prism with an area that has a diameter which is a maximum of 50% of the length of the prism.

3. Shock-isolating arrangement of inertial sensors, according to claim 1, further comprising:
   a housing in which the inertial sensors are mounted in a straight line one after the another and are rigidly connected to one another.

4. Shock-isolating arrangement of inertial sensors as claimed in claim 3, wherein the inertial sensors are ring laser gyroscopes.

5. Shock-isolating arrangement of inertial sensors as claimed in claim 3, wherein the inertial sensors are connected in a progressive manner with connecting or carrier elements.

6. Shock-isolating arrangement of inertial sensors as claimed in claim 3, wherein the inertial sensors comprise a centrally arranged inertial sensor for determining roll angle changes, and inertial sensors located laterally thereof for determining yaw angle changes or pitch angle changes.

7. Shock-isolating arrangement of inertial sensors as claimed in claim 3, wherein the inertial sensors are arranged such that effective moments of inertia of the masses of the inertial sensors, as compared to compliance of the shock reducing shock mounts by which the inertial sensors are attached assume values that are as large as possible.

8. Shock-isolating arrangement of inertial sensors as claimed in claim 3, wherein the inertial sensors are held in recesses of mounting elements, said mounting elements comprise a first mounting element for holding a gyroscope which detects mainly rolling revolutions around a lengthwise axis of the housing, a second mounting element that is flanged onto the first mounting element and a third mounting element which is, in turn, attached to second mounting element.

9. Shock-isolating arrangement of inertial sensors as claimed in claim 3, wherein the housing comprises a cylindrical outer shell and the initial sensors are located in the sensor platform of essentially hollow cylindrical shape which is attached coaxially within the cylindrical outer shell by means of the shock reducing shock mounts.

* * * * *